(12) United States Patent
Ornelas et al.

(10) Patent No.: US 10,506,057 B2
(45) Date of Patent: Dec. 10, 2019

(54) CLOUD BASED DIGITAL ALERT SYSTEM

(71) Applicant: Zonetap, Inc., Oakland, CA (US)

(72) Inventors: Mario Ornelas, Oakland, CA (US);
Miles Phillips, Clover, SC (US)

(73) Assignee: Zonetap, Inc., Oakland, CA (US)

( * ) Notice: Subject to any disclaimer, the term of this patent is extended or adjusted under 35 U.S.C. 154(b) by 245 days.

(21) Appl. No.: 15/464,646

(22) Filed: Mar. 21, 2017

(65) Prior Publication Data

US 2017/0272528 A1 Sep. 21, 2017

Related U.S. Application Data

(60) Provisional application No. 62/310,966, filed on Mar. 21, 2016.

(51) Int. Cl.
*H04L 29/08* (2006.01)
*H04W 4/021* (2018.01)
*H04L 29/06* (2006.01)

(52) U.S. Cl.
CPC ............ *H04L 67/26* (2013.01); *H04L 67/025* (2013.01); *H04L 67/18* (2013.01); *H04L 67/42* (2013.01); *H04W 4/021* (2013.01)

(58) Field of Classification Search
CPC ....... H04L 67/26; H04L 67/025; H04L 67/18; H04L 67/42; H04W 4/021

USPC ................................ 709/206, 217, 224, 227
See application file for complete search history.

(56) References Cited

U.S. PATENT DOCUMENTS

| | | | | |
|---|---|---|---|---|
| 2013/0225282 | A1* | 8/2013 | Williams | A63F 13/216 463/29 |
| 2014/0162692 | A1* | 6/2014 | Li | H04L 67/40 455/456.3 |
| 2016/0241997 | A1* | 8/2016 | Lucas | H04W 4/021 |

* cited by examiner

*Primary Examiner* — Chirag R Patel
*Assistant Examiner* — Marshall M Mcleod
(74) *Attorney, Agent, or Firm* — Schwegman Lundberg & Woessner, P.A.

(57) ABSTRACT

A digital alert system provides cloud based digital alerts to a client device. The digital alert system receives location data from a client device that describes a current location of the client device. The digital alert system determines that the current location of the client device is within a geo-fence associated with a client-side application installed on the client device, a user of the client device having authorized digital alerts associated with the client-side application. The digital alert system transmits, to the client device, a digital alert that is associated with the geo-fence. The digital alert includes a selectable component that operatively causes a web browser application installed on the client device to access web based content associated with the client-side application.

20 Claims, 5 Drawing Sheets

400

WHILE THE CLIENT DEVICE IS OPERATING IN A FIRST MODE, DETERMINING THAT THE CLIENT DEVICE HAS MOVED WITHIN A FIRST THRESHOLD DISTANCE OF A GEOGRAPHIC LOCATION ASSOCIATED WITH THE FIRST CLIENT-SIDE APPLICATION, THE FIRST MODE CAUSING THE CLIENT DEVICE TO TRANSMIT LOCATION DATA TO THE DIGITAL ALERT SYSTEM AT A FIRST FREQUENCY RATE
402

TRANSMITTING A COMMAND TO THE CLIENT DEVICE TO OPERATE IN A SECOND MODE THAT CAUSES THE CLIENT DEVICE TO TRANSMIT LOCATION DATA TO THE DIGITAL ALERT SYSTEM AT A SECOND FREQUENCY RATE THAT IS HIGHER THAN THE FIRST FREQUENCY RATE
404

*FIG. 4*

CLOUD BASED DIGITAL ALERT SYSTEM

CROSS-REFERENCE TO RELATED APPLICATIONS

The present application claims the benefit of priority of U.S. Provisional Application No. 62/310,966, filed on Mar. 21, 2016, which is incorporated herein by reference in its entirety.

TECHNICAL FIELD

The present disclosure generally relates to the technical field of special-purpose machines that facilitate digital alerts, including computerized variants of such special-purpose machines and improvements to such variants, and to the technologies by which such special-purpose machines become improved compared to other special-purpose machines that facilitate digital alerts. In particular, the present disclosure addresses systems and methods for cloud based digital alerts.

BACKGROUND

Client-side applications can be integrated with technology to provide digital alerts. For example, a client-side application can present a digital alert to notify a user of current weather conditions, nearby emergencies, etc. Currently, the process of integrating digital alerts into a client-side application is arduous. Many developers rely on a Software Developer Kit (SDK) provided by a $3^{rd}$ party to integrate digital alerts into a client-side application. To integrate the SDK, an experienced software developer tediously insert hundreds of lines of code from the SDK into appropriate portions of the application source code. After the code has been inserted, testing and debugging are performed to ensure that the code has been inserted correctly. While this process does enable the client-side application to cause presentation of digital alerts, the process is difficult, time consuming and costly. Accordingly, improvements are needed.

BRIEF DESCRIPTION OF THE DRAWINGS

Various ones of the appended drawings merely illustrate example embodiments of the present disclosure and are not intended to limit its scope to the illustrated embodiments. On the contrary, these examples are intended to cover alternatives, modifications, and equivalents as may be included within the scope of the disclosure.

FIG. 4 shows an example method for adjusting an operating mode of a client device, according to some example embodiments.

DETAILED DESCRIPTION

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details.

Disclosed are systems, methods, and computer-readable storage media for providing cloud based digital alerts. A cloud based digital alert system can be utilized to provide digital alerts to client devices. Utilizing a cloud based digital alert system greatly reduces the amount of time and effort spent integrating digital alerts into a client-side application. When utilizing a cloud based digital alert system, digital alerts are generated and transmitted by the cloud based digital alert system, rather than by a client-side application installed on the client device. To provide this functionality, the client-side application provides minimal information to the cloud based digital alert system, such as location data and a unique identifier. As a result, the amount of code that has to be integrated into the client-side application source code is greatly reduced in comparison to traditional methods.

While the digital alerts transmitted utilizing a cloud based digital alert system are not generated by the client-side application installed on the client device, the digital alert is enabled to link the user to content associated with the client-side application. For example, the digital alert includes a selectable component (e.g., hyperlink) that links the user to content associated with the client-side application. Selection of the selectable component causes a web browser application installed on the client device to access web based content associated with the client-side application.

Figure 1:
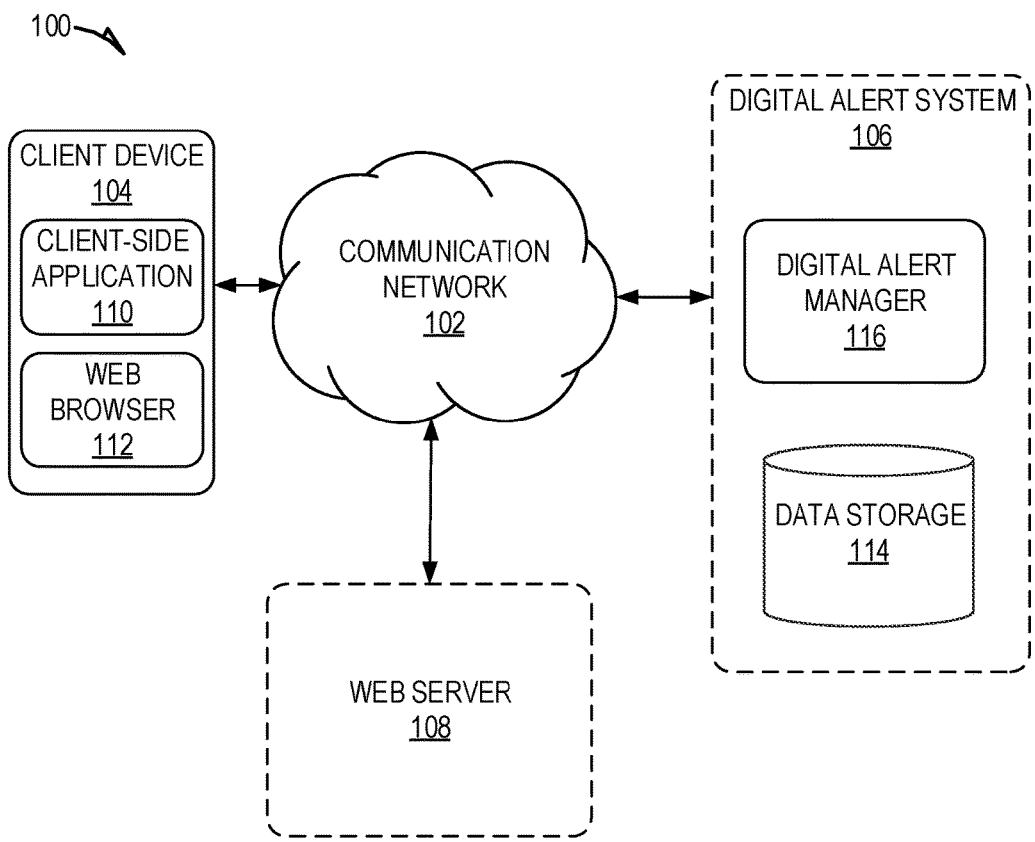
FIG. 1 shows an exemplary system for providing cloud based digital alerts, according to some example embodiments.

FIG. 1 shows an exemplary system 100 for providing cloud based digital alerts, according to some example embodiments. While system 100 employs a client-server architecture, the present inventive subject matter is, of course, not limited to such an architecture, and could equally well find application in an event-driven, distributed, or peer-to-peer architecture system, for example. Moreover, it shall be appreciated that although the various functional components of system 100 are discussed in a singular sense, multiple instances of one or more of the various functional components may be employed.

As shown, system 100 can include multiple computing devices connected to communication network 102 and configured to communicate with each other through use of communication network 102. Communication network 102 can be any type of network, including a local area network ("LAN"), such as an intranet, a wide area network ("WAN"), such as the internet, or any combination thereof. Further, communication network 102 can be a public network, a private network, or a combination thereof. Communication network 102 can also be implemented using any number of communication links associated with one or more service providers, including one or more wired communication links, one or more wireless communication links, or any combination thereof. Additionally, communication network 102 can be configured to support the transmission of data formatted using any number of protocols.

Multiple computing devices can be connected to communication network 102. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 500 of FIG. 5.

To facilitate communication with other computing devices, a computing device can include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

As shown, system 100 includes client device 104, digital alert system 106 and web server 108. In system 100, client device 104 can interact with digital alert system 106 and web server 108 through communication network 102 by direct and/or indirect communication. Client device 104 can be any of a variety of types of computing devices that include at least a display, a computer processor, and communication capabilities that provide access to communication network 102 (e.g., a smart phone, a tablet computer, a personal digital assistant (PDA), a personal navigation device (PND), a handheld computer, a desktop computer, a laptop or netbook, or a wearable computing device).

Digital alert system 106 and web server 108 can each consist of one or more computing devices and support connections from a variety of different types of client devices 104, such as desktop computers; mobile computers; mobile communications devices (e.g. mobile phones, smart phones, tablets, etc.); smart televisions; set-top boxes; and/or any other network enabled computing devices. Client device 104 can be of varying type, capabilities, operating systems, etc. Furthermore, digital alert system 106 can concurrently accept connections from and interact with multiple client devices 104.

Client device 104 interacts with digital alert system 106 via client-side application 110 installed on client device 104. In some embodiments, source code for client-side application 110 has been embedded with code enabling client-side application 110 to communicate with digital alert system 106.

Client device 104 can also interact with web server 108 via client-side application 110 to facilitate application functionality of client-side application 110. In some embodiments, client-side application 110 includes a specific component to communicate with web server 108. For example, the component can be a stand-alone application, one or more application plug-ins, and/or a browser extension. Client device 104 can also interact with web server 108 via web browser 112 that resides on client device 104. In either case, client-side application 110 and/or web browser 112 can present a user interface (UI) for the user to interact with content provided by web server 108.

Although client device 104 is shown as including only a single client-side application 110 and web browser 112, this is only for ease of explanation and is not meant to be limiting. Client device 104 can include any number of client-side application 110 and web browsers 112, and this disclosure envisions all such embodiments. Likewise, system 100 can include any number of client devices 104 and web servers 108, and this disclosure envisions all such embodiments.

Digital alert system 106 includes data storage 114 to store data. The stored data can include any type of data, such as digital data, documents, text files, audio files, video files, etc. Data storage 114 can be a storage device, multiple storage devices, or one or more servers. Alternatively, data storage 114 can be a cloud storage provider or network storage. Digital alert system 106 can store data in a network accessible storage (SAN) device, in a redundant array of inexpensive disks (RAID), etc. Data storage 114 can store data items using one or more partition types, such as FAT, FAT32, NTFS, EXT2, EXT3, EXT4, ReiserFS, BTRFS, and so forth.

Data storage 114 maintains profiles for multiple users. Each profile can be identified by a unique identifier to maintain the anonymity of the user associated with the profile. A unique identifier can be any type of identifier, such as a string, integer, etc. Each profile includes a listing of client-side applications that the corresponding user has authorized for digital alerts. A digital alert is a digital message that is presented on a display of client device 104. For example, a digital alert can be a push notification that is presented on the display of client device 104. A user can authorize a client-side application for digital alerts by opting to receive digital alerts from the client-side application.

Data storage 114 further maintains digital alert conditions and corresponding digital alerts associated with each client-side application. Digital alert conditions dictate conditions that when met trigger transmission of the digital alert corresponding to the digital alert condition. For example, a digital alert condition can include data describing a geographic area (e.g., geo-fence) that when entered by a user results in transmission of a digital alert. As another example, a digital alert condition can include time periods during which digital alerts should and should not be transmitted.

The geo-fences can be defined by an administrator or other user associated with the corresponding client-side application. Multiple geo-fences can be associated with a client-side application. A geo-fence can be set around any type of area. For example, a geo-fence can be set around a physical retail location, a portion of a physical retail location, etc.

Digital alert system 106 includes digital alert manager 112 configured to provide digital alerts to client device 104. Digital alert manager 116 determines when to transmit a digital alert based on data received from client device 104. For example, the source code for client-side application 110 can include code that causes client device 104 to periodically transmit data to digital alert system 106. A user of client device 104 may also have to enable location based services to cause location data to be transmitted to digital alert manager 116.

The data transmitted to digital alert system 106 can be minimal to maintain simplicity and ease of integration. For example, the data can include location data gathered by client device 104 as well a unique identifier associated with a user of client device 104.

The location data describes the geographic location of client device 104. For example, the location data can include geographic coordinate data gathered by client device 104. In some embodiments, the location data includes timestamp data describing the time at which the location data was gathered by client device 104. Client device 104 can gather location data using any known techniques. For example, client device 104 can gather location data using a Global Positioning System (GPS), Indoor Positioning Systems (IPS) (i.e., currently known positioning systems in the art used to locate objects or people inside a building using radio waves, magnetic fields, acoustic signals, or other sensory information collected by a mobile device), location systems using WiFi, location systems using cellular antennas, and other related technologies.

Digital alert manager 116 uses the data received from client device 104 to determine whether to transmit a digital alert to client device 104. For example digital alert manager 116 uses the unique identifier received from client device 104 to identify the corresponding profile in data storage 114. The digital alert manager 116 identifies, from the corresponding profile, the client-side applications authorized for digital alerts. Digital alert manager 116 can then determine whether any corresponding digital alert conditions have been met (e.g., is the current location of client device 104 within a geo-fence and/or was the location data received during a designated active period associated with the geo-fence). If a digital alert condition has been met, digital alert manager 116 can transmit the appropriate digital alert to client device 104.

A digital alert can include a selectable portion that causes client device 104 to access associated web content. For example, the selectable portion can be selectable Uniform Resource Locator that causes client-side 110 to access corresponding content maintained by web server 108. The web content can include a website associated with client-side application 110, a promotion associated with a nearby retailer, a coupon associated with an item nearby the user, etc. A user of client device 104 can utilize the selectable portion to access the corresponding content from web server 108.

Transmitting location data to digital alert system 106 can be resource intensive. Accordingly, digital alert system 106 can adjust an operating mode of client device 104 to increase or decrease a frequency rate at which client device 104 transmits location data to digital alert system 106. A frequency rate dictates time intervals at which data is transmitted. For example, a higher frequency rate causes data to be transmitted more frequently (i.e., according to shorter time intervals). Conversely, a lower frequency rate causes data to be transmitted less frequently (i.e., according to longer time intervals).

Digital alert system 106 adjusts the operating mode of client device 104 based on a determined distance of client device 104 from a geo-fence that would trigger a digital alert being transmitted to client device 104. When client device 104 is far from a geo-fence, location data can be transmitted less frequently (i.e., at a lower frequency rate) to reduce resource usage. Conversely, when client device 104 is near a geo-fence, location data can be transmitted more frequently (i.e., at a higher frequency rate) to ensure that a digital alert is transmitted if the user enters the geo-fence.

Digital alert manager 116 utilizes location data received from client device 104 to determine the distance of client device 104 to a geo-fence that would trigger a digital alert being transmitted to client device 104. Digital alert manager 116 then compares the determined distance to threshold distances that dictate a corresponding operating modes for client device 104. To change the operating mode of client device 104, digital alert manager 116 transmits a command to client device 104 causing client device 104 to change its operating mode accordingly.

Figure 2:
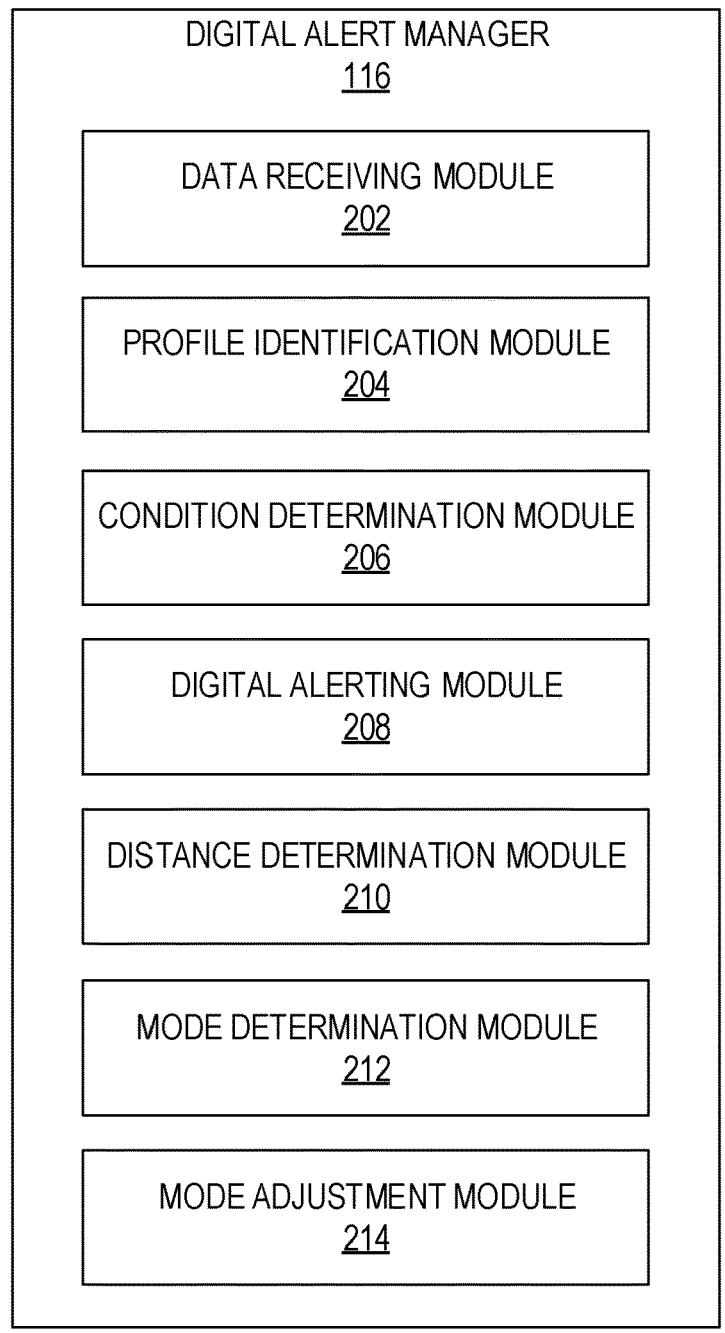
FIG. 2 shows an example block diagram of a digital alert manger, according to some example embodiments.

FIG. 2 shows an example block diagram of a digital alert manger 112, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by digital alert manger 112 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, digital alert manger 112 includes data receiving module 202, profile identification module 204, condition determination module 206, digital alerting module 208, distance determination module 210, mode determination module 212 and mode adjustment module 214.

Data receiving module 202 receives data from client device 104. The data can be transmitted by client-side application 110 that includes code causing client-side application 110 to transmit the data to digital alert system 104. Additionally, a user of client device 104 may have opted to allow location based services with relation to client-side application 110.

The data received from client device 104 can include location data describing a current location of client device 104 as well as a unique identifier associated with a user of client device 104.

Profile identification module 204 utilizes the unique identifier received from client device 104 to identify a corresponding profile stored in data storage 114. Profile identification module 204 searches data storage 114 based on the unique identifier to identify the corresponding profile. The profile includes a list of client-side applications that the user associated with the profile has authorized for digital alerts. For example, a user may have opted to receive digital alerts with relation to the client-side applications.

Condition determination module 206 determines whether digital alert conditions have been met. Condition determination module 206 can utilize the current location of client device 104 to determine whether client device 104 is within a geo-fence dictated by the digital alert conditions. Condition determination module 206 can also utilize a timestamp value associated with the location data to determine whether a temporal condition associated with a geo-fence has been satisfied. For example, a geo-fence can be associated with a designated active period during which digital alerts are to be transmitted. Accordingly, if a user is within a geo-fence during a period of time that is not a designated active period, a digital alert will not be transmitted to client device 104.

Digital alerting module 208 transmits a digital alert to client device 104 in the event that digital alert conditions have been triggered. A digital alert condition can be associated with a corresponding digital alert. Digital alert module 208 transmits the corresponding alert to client device 104. In some embodiments, digital alerting module 208 transmits the digital alert as a push notification.

The digital alert can include a selectable portion, such as an active URL link, that allows a user to access content maintained by web server 108. The content can be associated with client-side application 110. For example, the content can include a website, promotion, information, etc., associated with client-side application 110.

In some embodiments, the content is a digital coupon that can be redeemed at a retailer. For example, the content can include a scannable code, such as a Quick Read (QR) code, bar code, etc., that a user can present to a retailer to be redeemed for a corresponding promotion. In some embodiments, the digital coupon can be associated with an expiration time that causes the digital coupon to be time sensitive.

Accordingly, the user must redeem the digital coupon prior to the associated expiration time to receive the corresponding promotion.

Distance determination module 210 determines a distance between client device 104 and a geo-fence that would trigger a digital alert. In some embodiments, the distance between client device 104 and the geo-fence is the distance between client device 104 and a closest geo-fence. As another example, the distance between client device 104 and the geo-fence is the average distance between client device 104 and a predetermined number of closest geo-fences, such as the 3 closest geo-fences.

Mode determination module 212 compares the distance between client device 104 and a geo-fence to threshold distances to determine a corresponding mode that client device 104 should be operating in. For example, the operating mode of client device 104 can be changed to increase the frequency rate when client device 104 the distance between client device 104 and the geo-fence is relatively short. Conversely, the operating mode of client device 104 can be changed to decrease the frequency rate when client device 104 when the distance between client device 104 and the geo-fence is relatively longer.

Mode adjustment module 214, transmits commands to client device 104 to cause client device 104 to change its operating mode. For example, the command can include data identifying the updated mode that client device 104 should be operating by and/or an updated frequency rate that client device 104 should utilize.

Figure 3:
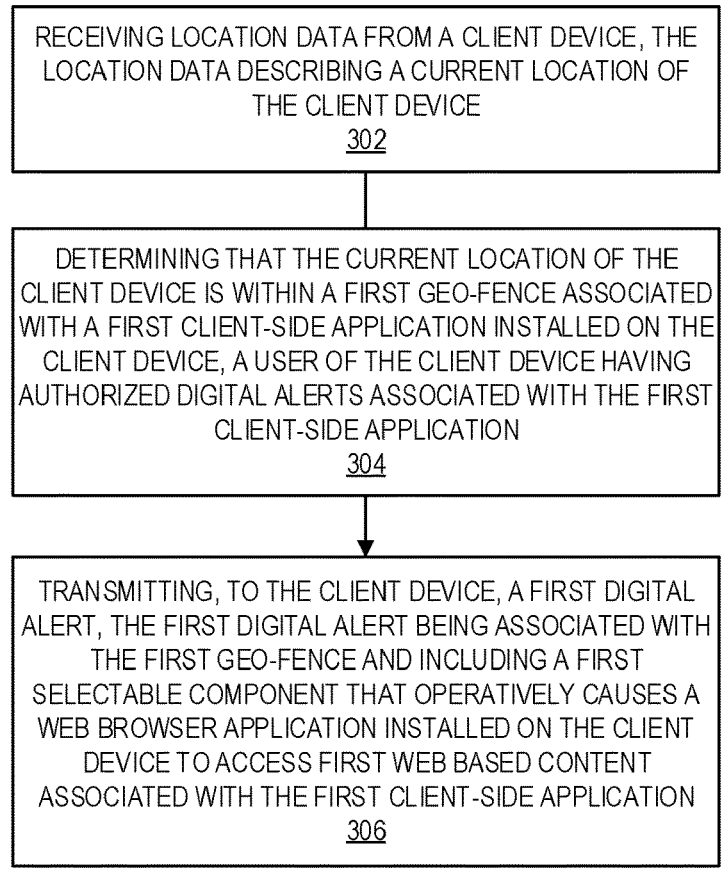
FIG. 3 shows an example method for providing cloud based digital alerts, according to some example embodiments.

FIG. 3 shows an example method for providing cloud based digital alerts, according to some example embodiments. Method 300 may be embodied in computer readable instructions for execution by one or more processors such that the operations of method 300 may be performed in part or in whole by digital alert manger 112; accordingly, method 300 is described below by way of example with reference thereto. However, it shall be appreciated that at least some of the operations of method 300 may be deployed on various other hardware configurations and method 300 is not intended to be limited to digital alert manger 112.

At operation 302, data receiving module 202 receives location data from client device 104. The location data describes a current location of client device 104. In some embodiments, the location data includes an identifier assigned to the user of client device 104.

At operation 304, condition determination module 206 determines that the current location of client device 104 is within a first geo-fence associated with client-side application 110 installed on client device 104, a user of client device 104 having authorized digital alerts associated with client-side application 110. In some embodiments, profile identification module 204 determines, based on the identifier, a set of client-side applications that are installed on client device 104 for which the user has authorized digital alerts. The set of client-side applications includes client-side application 110. Condition determination module 206 determines, based on the set of client-side applications, data describing a set of geo-fences corresponding to the set of client-side applications that trigger transmission of digital alerts to client device 104. The set of geo-fences includes the first geo-fence.

In addition to determining that the current location of client device 104 is within the first geo-fence, in some embodiments, condition determination module 206 determines that the location data was received during a designated active period associated with the first geo-fence. If condition determination module 206 had determined that the location data was not received during the designated active period (i.e., the location data was received outside of a designated active period), digital alert system 106 would not transmit an alert message associated with the first geo-fence to client device 104.

At operation 306, digital alerting module 208 transmits, to client device 104, a first digital alert. The first digital alert is associated with the first geo-fence and includes a first selectable component that operatively causes web browser application 112 installed on client device 104 to access first web based content associated with client-side application 110. The first web based content can be any type of content, such as website, video, digital coupon, etc. In some embodiments, the first content is redeemable by the user at a retailer associated with client-side application 110 until an expiration time associated with the first content.

Although method 300 describes only a single geo-fence, this is only for ease of explanation and is not meant to be limiting. Client-side application 110 can be associated with any number of geo-fences. For example, condition determination module 206 can receive updated location data describing an updated current location of client device 104, and condition determination module 206 can determine that the updated current location of client device 104 is within a second geo-fence associated with client-side application 110. As a result, digital alerting module 208 would transmit a second digital alert to client device 104 that is associated with the second geo-fence. The second digital alert could include a second selectable component that operatively causes web browser application 112 to access second web based content associated with the client-side application 110. Further, the second web content can be different than the first web content.

FIG. 4 shows an example method for adjusting an operating mode of a client device, according to some example embodiments. Method 400 may be embodied in computer readable instructions for execution by one or more processors such that the operations of method 400 may be performed in part or in whole by digital alert manger 112; accordingly, method 400 is described below by way of example with reference thereto. However, it shall be appreciated that at least some of the operations of method 400 may be deployed on various other hardware configurations and method 400 is not intended to be limited to digital alert manger 112.

While client device 104 is operating in a first mode, at operation 402, mode determination module 212 determines that client device 104 has moved within a first threshold distance of a geographic location associated with client-side application 110 (e.g., with a first threshold distance of a geo-fence associated with client-side application 110). The first mode causes client device 104 to transmit location data to digital alert system 106 at a first frequency rate.

At operation 404, mode adjustment module 214 transmits a command to client device 104 to operate in a second mode. The second mode causes client device 104 to transmit location data to digital alert system 106 at a second frequency rate that is higher than the first frequency rate.

Digital alert system 106 continues to monitor the location of client device 104 and adjust the operating mode. For example, while client device 104 is operating in the second mode, mode determination module 212 can determine that client device 104 has moved outside of the first threshold distance of the geographic location associated with client-side application 110. In response, mode adjustment module 214 would transmit a command to client device 104 to operate in the first mode. As a result, client device 104 would transmit location data to digital alert system 106 at the first frequency rate.

In some embodiments, multiple threshold distances. For example, while client device 104 is operating in the second mode, mode determination module 212 can determine that client device 104 has moved within a second threshold distance of the geographic location associated with client-side application 110, the second threshold distance being shorter than the first threshold distance. In response, mode adjustment module 214 would transmit a command to client device 104 to operate in a third mode that causes client device 104 to transmit location data to digital alert system 106 at a third frequency rate that is higher than the second frequency rate.

Figure 5:
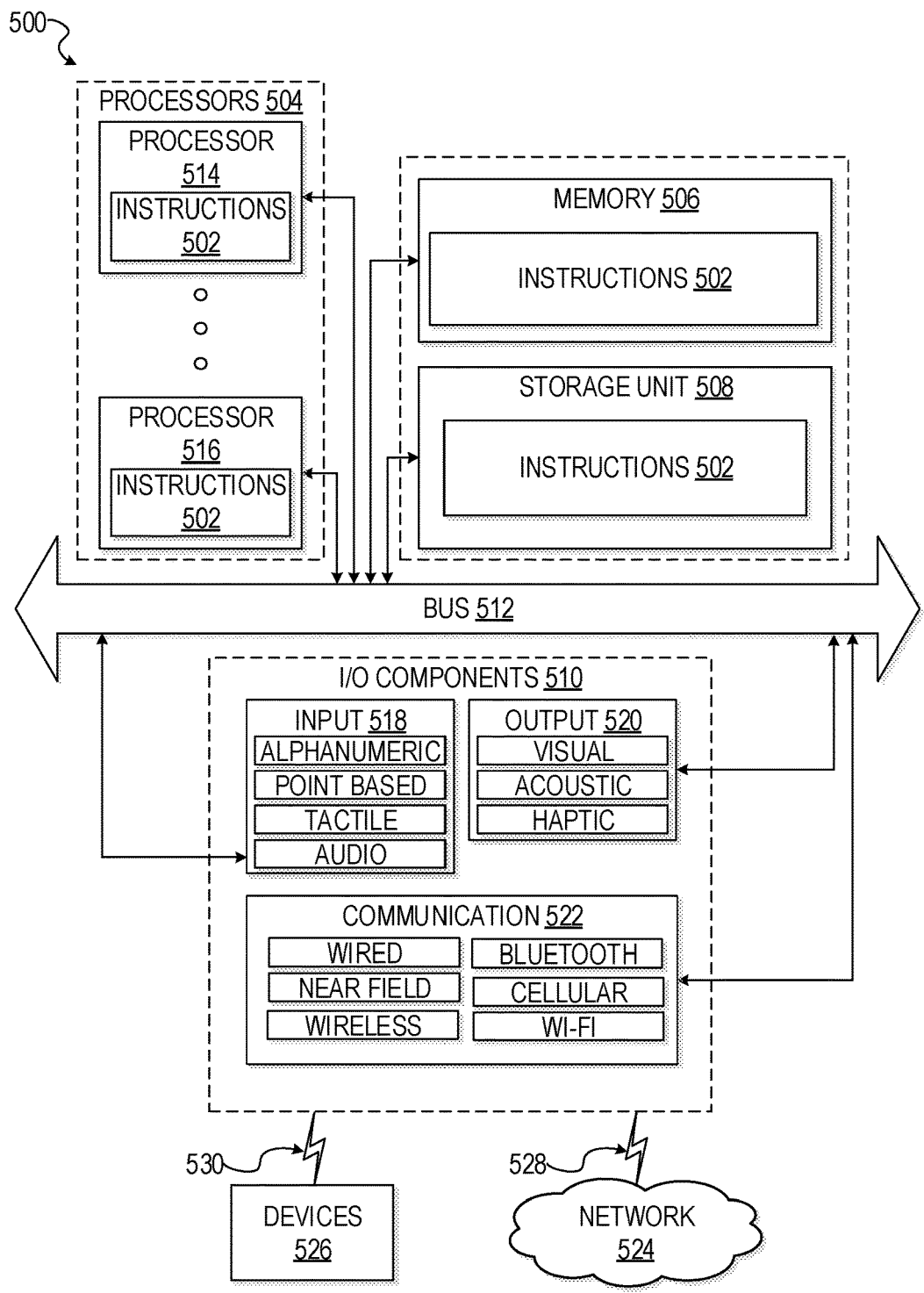
FIG. 5 shows a diagrammatic representation of a computing device in the example form of a computer system within which a set of instructions for causing the computing device to perform any one or more of the methodologies discussed herein may be executed.

FIG. 5 shows a block diagram illustrating components of a computing device 500, according to some example embodiments, able to read instructions from a machine-readable medium (e.g., a machine-readable storage medium) and perform any one or more of the methodologies discussed herein. Specifically, FIG. 5 shows a diagrammatic representation of computing device 500 in the example form of a system, within which instructions 502 (e.g., software, a program, an application, an applet, an app, a driver, or other executable code) for causing computing device 500 to perform any one or more of the methodologies discussed herein may be executed. For example, instructions 502 include executable code that causes computing device 500 to execute method 300 and 400. In this way, these instructions transform the general, non-programmed machine into a particular machine programmed to carry out the described and illustrated functions in the manner described herein. Computing device 500 may operate as a standalone device or may be coupled (e.g., networked) to other machines.

By way of non-limiting example, computing device 500 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing instructions 502, sequentially or otherwise, that specify actions to be taken by computing device 500. Further, while only a single computing device 500 is illustrated, the term "machine" shall also be taken to include a collection of computing devices 500 that individually or jointly execute instructions 502 to perform any one or more of the methodologies discussed herein.

Computing device 500 may include processors 504, memory 506, storage unit 508 and I/O components 510, which may be configured to communicate with each other such as via bus 512. In an example embodiment, processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 514 and processor 516 that may execute instructions 502. The term "processor" is intended to include multi-core processors that may comprise two or more independent processors (sometimes referred to as "cores") that may execute instructions contemporaneously. Although FIG. 5 shows multiple processors, computing device 500 may include a single processor with a single core, a single processor with multiple cores (e.g., a multi-core process), multiple processors with a single core, multiple processors with multiples cores, or any combination thereof Memory 506 (e.g., a main memory or other memory storage) and storage unit 508 are both accessible to processors 504 such as via bus 512. Memory 506 and storage unit 508 store instructions 502 embodying any one or more of the methodologies or functions described herein. In some embodiments, database 516 resides on storage unit 508. Instructions 502 may also reside, completely or partially, within memory 506, within storage unit 508, within at least one of processors 504 (e.g., within the processor's cache memory), or any suitable combination thereof, during execution thereof by computing device 500. Accordingly, memory 506, storage unit 508, and the memory of processors 504 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 502. The term "machine-readable medium" shall also be taken to include any medium, or combination of multiple media, that is capable of storing instructions (e.g., instructions 502) for execution by a machine (e.g., computing device 500), such that the instructions, when executed by one or more processors of computing device 500 (e.g., processors 504), cause computing device 500 to perform any one or more of the methodologies described herein (e.g., method 300 and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine will depend on the type of machine. For example, portable machines such as mobile phones will likely include a touch input device or other such input mechanisms, while a headless server machine will likely not include such a touch input device. It will be appreciated that I/O components 510 may include many other components that are not specifically shown in FIG. 5. I/O components 510 are grouped according to functionality merely for simplifying the following discussion and the grouping is in no way limiting. In various example embodiments, I/O components 510 may include input components 518 and output components 520. Input components 518 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. Output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. I/O components 510 may include communication components 522 operable to couple computing device 500 to network 524 or devices 526 via coupling 528 and coupling 530, respectively. For example, communication components 522 may include a network interface component or other suitable device to interface with network 524. In further examples, communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1126 may be another machine or any of a wide variety of peripheral devices (e.g., a peripheral device coupled via a Universal Serial Bus (USB)).

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A method comprising:

providing, by a digital alert system, a piece of code to both a first entity and a second entity that have accounts with the digital alert system, the piece of code configured to be added to third party applications to enable the third party applications to communication with and utilize the functionality of the digital alert system, wherein the first entity is different than the second entity, the first entity is associated with a first client-side application, the second entity is associated with a second client-side application, and the first client side application is different than the second client side application;

receiving, by the digital alert system, location data from a first client device, the location data from the first client device describing a current location of the first client device, transmission of the location data from the first client device having been caused by the first client-side application that is installed on the first client device, the first client-side application embedded with the piece of code to enable the first client side application to communicate with and utilize the functionality of the digital alert system;

determining, by the digital alert system, that the current location of the first client device is within a first geo-fence associated with the account of the first entity, a user of the first client device having authorized digital alerts associated with the first client-side application; and transmitting, to the first client device, a first digital alert, the first digital alert being associated with the first geo-fence and including a first selectable component that operatively causes a web browser application installed on the first client device to access first web based content associated with the first entity;

receiving, by the digital alert system, location data from a second client device that is different than the first client device, the location data from the second client device describing a current location of the second client device, transmission of the location data from the second client device having been caused by the second client-side application that is installed on the second client device, the second client-side application embedded with the piece of code to enable the second client side application to communicate with and utilize the functionality of the digital alert system;

determining, by the digital alert system, that the current location of the second client device is within a second geo-fence associated with the account of the second entity, a user of the second client device having authorized digital alerts associated with the second client-side application: and transmitting, to the second client device, a second digital alert, the second digital alert being associated with the second geo-fence and including a second selectable component that operatively causes a web browser application installed on the second client device to access second web based content associated with the second entity.

2. The method of claim 1, further comprising:
receiving, from the first client device, updated location data describing an updated current location of the first client device;
determining that the updated current location of the first client device is within a third geo-fence that is associated with the account of the first entity; and
transmitting, to the first client device, a subsequent digital alert, the subsequent digital alert being associated with the third geo-fence and including a third selectable component that operatively causes the web browser application installed on the first client device to access third web based content associated with the first entity, the third web content being different than the first web content.

3. The method of claim 1, further comprising:
while the first client device is operating in a first mode, determining that the first client device has moved within a first threshold distance of a geographic location associated with the first client-side application, the first mode causing the first client device to transmit location data to the digital alert system at a first frequency rate; and
transmitting a command to the first client device to operate in a second mode that causes the first client device to transmit location data to the digital alert system at a second frequency rate that is higher than the first frequency rate.

4. The method of claim 3, further comprising:
while the first client device is operating in the second mode, determining that the first client device has moved within a second threshold distance of the geographic location associated with the first client-side application, the second threshold distance being shorter than the first threshold distance; and
transmitting a subsequent command to the first client device to operate in a third mode that causes the first client device to transmit location data to the digital alert system at a third frequency rate that is higher than the second frequency rate.

5. The method of claim 3, further comprising:
while the first client device is operating in the second mode, determining that the first client device has moved outside of the first threshold distance of the geographic location associated with the first client-side application; and
transmitting a subsequent command to the first client device to operate in the first mode.

6. The method of claim 1, wherein the location data received from the first client device includes an identifier assigned to the user of the first client device.

7. The method of claim 6, further comprising:
determining, based on the identifier, a set of client-side applications that are installed on the first client device for which the user has authorized digital alerts, the set of client-side application including the first client-side application;
determining, based on the set of client-side applications, data describing a set of geo-fences corresponding to the set of client-side applications that trigger transmission of digital alerts to the first client device, the set of geo-fences including the first geo-fence.

8. The method of claim 1, further comprising:
determining that the location data received from the first client device was received during a designated active period associated with the first geo-fence.

9. The method of claim 8, further comprising:
receiving, from the first client device, updated location data describing an updated current location of the first client device;
determining that the updated current location of the first client device is within a third geo-fence associated with the first client-side application installed on the first client device;
determining that the updated location data was received outside of a designated active period associated with the third geo-fence, causing the digital alert system to not transmit an alert message associated with the third geo-fence to the first client device.

10. The method of claim 1, wherein the first content is redeemable by the user at a retailer associated with the first client-side application until an expiration time associated with the first content.

11. A digital alert system comprising:
one or more computer processors; and
one or more computer-readable mediums storing instructions that, when executed by the one or more computer processors, cause the digital alert system to perform operations comprising:
providing a piece of code to both a first entity and a second entity that have accounts with the digital alert system, the piece of code configured to be added to third party applications to enable the third party applications to communication with and utilize the functionality of the digital alert system, wherein the first entity is different than the second entity, the first entity is associated with a first client-side application, the second entity is associated with a second client-side application, and the first client side application is different than the second client side application;
receiving location data from a first client device, the location data from the first client device describing a current location of the first client device, transmission of the location data from the first client device having been caused by the first client-side application that is installed on the first client device, the first client-side application embedded with the piece of code to enable the first client side application to communicate with and utilize the functionality of the digital alert system;

determining that the current location of the first client device is within a first geo-fence associated with the account of the first entity, a user of the first client device having authorized digital alerts associated with the first client-side application; and transmitting, to the first client device, a first digital alert, the first digital alert being associated with the first geo-fence and including a first selectable component that operatively causes a web browser application installed on the first client device to access first web based content associated with the first entity;

receiving location data from a second client device that is different than the first client device, the location data from the second client device describing a current location of the second client device, transmission of the location data from the second client device having been caused by the second client-side application that is installed on the second client device, the second client-side application embedded with the piece of code to enable the second client side application to communicate with and utilize the functionality of the digital alert system;

determining that the current location of the second client device is within a second geo-fence associated with the account of the second entity, a user of the second client device having authorized digital alerts associated with the second client-side application; and transmitting, to the second client device, a second digital alert, the second digital alert being associated with the second geo-fence and including a second selectable component that operatively causes a web browser application installed on the second client device to access second web based content associated with the second entity.

12. The digital alert system of claim 11, the operations further comprising:

receiving, from the first client device, updated location data describing an updated current location of the first client device;

determining that the updated current location of the first client device is within a third geo-fence that is associated with the account of the first entity; and transmitting, to the first client device, a subsequent digital alert, the subsequent digital alert being associated with the third geo-fence and including a third selectable component that operatively causes the web browser application installed on the first client device to access third web based content associated with the first entity, the third web content being different than the first web content.

13. The digital alert system of claim 11, the operations further comprising:

while the first client device is operating in a first mode, determining that the first client device has moved within a first threshold distance of a geographic location associated with the first client-side application, the first mode causing the first client device to transmit location data to the digital alert system at a first frequency rate; and transmitting a command to the first client device to operate in a second mode that causes the first client device to transmit location data to the digital alert system at a second frequency rate that is higher than the first frequency rate.

14. The digital alert system of claim 13, the operations further comprising:

while the first client device is operating in the second mode, determining that the first client device has moved within a second threshold distance of the geographic location associated with the first client-side application, the second threshold distance being shorter than the first threshold distance; and transmitting a subsequent command to the first client device to operate in a third mode that causes the first client device to transmit location data to the digital alert system at a third frequency rate that is higher than the second frequency rate.

15. The digital alert system of claim 13, the operations further comprising:

while the first client device is operating in the second mode, determining that the first client device has moved outside of the first threshold distance of the geographic location associated with the first client-side application; and transmitting a subsequent command to the first client device to operate in the first mode.

16. The digital alert system of claim 11, wherein the location data received from the first client device includes an identifier assigned to the user of the first client device.

17. The digital alert system of claim 16, the operations further comprising:

determining, based on the identifier, a set of client-side applications that are installed on the first client device for which the user has authorized digital alerts, the set of client-side application including the first client-side application;

determining, based on the set of client-side applications, data describing a set of geo-fences corresponding to the set of client-side applications that trigger transmission of digital alerts to the first client device, the set of geo-fences including the first geo-fence.

18. The digital alert system of claim 11, the operations further comprising:

determining that the location data received from the first client device was received during a designated active period associated with the first geo-fence.

19. The digital alert system of claim 18, the operations further comprising:

receiving, from the first client device, updated location data describing an updated current location of the first client device;

determining that the updated current location of the first client device is within a third geo-fence associated with the first client-side application installed on the first client device;

determining that the updated location data was received outside of a designated active period associated with the third geo-fence, causing the digital alert system to not transmit an alert message associated with the third geo-fence to the first client device.

20. A non-transitory computer-readable medium storing instructions that, when executed by one or more computer processors of a digital alert system, cause the digital alert system to perform operations comprising:

providing a piece of code to both a first entity and a second entity that have accounts with the digital alert system, the piece of code configured to be added to third party applications to enable the third party applications to communication with and utilize the functionality of the digital alert system, wherein the first entity is different than the second entity, the first entity is associated with a first client-side application, the second entity is associated with a second client-side application, and the first client side application is different than the second client side application;

receiving location data from a first client device, the location data from the first client device describing a current location of the first client device, transmission of the location data from the first client device having been caused by the first client-side application that is installed on the first client device, the first client-side application embedded with the piece of code to enable the first client side application to communicate with and utilize the functionality of the digital alert system;

determining that the current location of the first client device is within a first geo-fence associated with the account of the first entity, a user of the first client device having authorized digital alerts associated with the first client-side application; and transmitting, to the first client device, a first digital alert, the first digital alert being associated with the first geo-fence and including a first selectable component that operatively causes a web browser application installed on the first client device to access first web based content associated with the first entity;

receiving location data from a second client device that is different than the first client device, the location data from the second client device describing a current location of the second client device, transmission of the location data from the second client device having been caused by the second client-side application that is installed on the second client device, the second client-side application embedded with the piece of code to enable the second client side application to communicate with and utilize the functionality of the digital alert system;

determining that the current location of the second client device is within a second geo-fence associated with the account of the second entity, a user of the second client device having authorized digital alerts associated with the second client-side application; and transmitting, to the second client device, a second digital alert, the second digital alert being associated with the second geo-fence and including a second selectable component that operatively causes a web browser application installed on the second client device to access second web based content associated with the second entity.

* * * * *